(12) United States Patent
Turner

(10) Patent No.: US 6,293,520 B1
(45) Date of Patent: Sep. 25, 2001

(54) CABLE PULLER AND METHOD OF INSTALLING CABLES

(75) Inventor: Russell Wayne Turner, Richardson, TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/689,440

(22) Filed: Oct. 12, 2000

(51) Int. Cl.[7] .................................................. H02G 1/00
(52) U.S. Cl. .............................. 254/134.5; 254/134.3 R
(58) Field of Search .................. 254/134.3 R, 134.3 CL, 254/134.3 PD

(56) References Cited

U.S. PATENT DOCUMENTS

| | | | | |
|---|---|---|---|---|
| 1,569,521 | * | 1/1926 | Milton | 254/134.3 R |
| 3,672,636 | * | 6/1972 | Parsen | 254/134.3 R |
| 3,814,383 | * | 6/1974 | Jackson | 254/134.3 CL |
| 3,844,535 | * | 10/1974 | Dorough, Jr. | 254/103 |
| 4,014,516 | * | 3/1977 | Jacks | 254/134.3 R |
| 5,901,651 | * | 5/1999 | Boyd | 254/134.3 R |

\* cited by examiner

Primary Examiner—Joseph J. Hail, III
Assistant Examiner—Lee Wilson
(74) Attorney, Agent, or Firm—Arthur I. Navarro

(57) ABSTRACT

A cable pulling device for installing a second cable (14) along side an existing first cable (12). The cable puller (10) consists of a body (20) with a motor (22) mounted to the body (20). The motor (22) has an output shaft (24) attached to a drive wheel (26). The drive wheel (26) turns against the first cable (12) to propel the cable puller (10) along the first cable (12). The cable puller (10) also includes a motor controller (28) operably coupled to the motor (22) to control the motion of the motor (22). A cable clamp (30) is attached to the body (20) to secure a second cable (14) as it is pulled into position along side the first cable (12).

28 Claims, 2 Drawing Sheets

CABLE PULLER AND METHOD OF INSTALLING CABLES

TECHNICAL FIELD

This invention relates in general to the installation of cables. More particularly, the invention relates to a device for pulling a cable into place along side an existing cable.

BACKGROUND OF THE INVENTION

It is often necessary to increase the number of cables supplying services to a building, such as an office or apartment building. For example, as more telephones, fax machines, computers and other telephony devices are installed in an office building, additional phone cables are required to support the increased demand for phone service. Consequentially, as demand for more types of wired services increase, more cables are required to support the services, whether the service is electrical, telephony, cable TV, data or other services requiring wired access.

Substantial interest has long been shown by providers of such services to increase capacity to a location such as a building. Today, when an existing cable will not support additional service, a "severing" method is utilized. That is, the existing cable is severed and a new cable is tied to one end of the severed cable and used to pull the new cable into position. Thus, the new cable must be capable of supporting the capacity of the cable it replaces, plus the forecast growth.

This method of cable installation, however, suffers from several disadvantages. First, the existing cable becomes dysfunctional since it is severed and no longer utilized. Further, the severing method is inconvenient for consumers since they suffer from interruption of service during the time the existing cable is severed until the new cable is installed.

As such, a need exists for a means of facilitating all installations to accumulate increased demand for wired services. A means of installing a cable without severing existing cables or interrupting service would provide numerous advantages.

SUMMARY OF THE INVENTION

The present invention provides for a cable pulling device which can be utilized to pull a cable into position alongside an existing cable, in order to increase capacity.

Disclosed in one embodiment is a cable puller for installing a second cable alongside an existing first cable. The cable puller comprises a body having a motor mounted to the body. The motor has an output shaft which attaches to a drive wheel. The drive wheel turns against the first cable to propel the cable puller along the first cable. The cable puller also has a motor controller which is connected to the motor and is adapted to control the motion of the motor. Further, the cable puller has a cable clamp which is attached to the body to hold the second cable securely in the body of the cable puller as it is pulled along the first cable.

In one embodiment, the cable puller has at least one pressure wheel attached to the body and adapted to press the first cable against the drive wheel. In another embodiment, the cable puller has at least one drive wheel which is attached to the body and adapted to help guide the first cable as it passes through the body of the cable puller. In still another embodiment, the cable puller further comprises a cable crimper adapted to set a plurality of tie wraps along said first cable as the cable puller pulls the second cable along into position. In this way, the cable crimper tightens the tie wraps around the first and second cables as the cable crimper returns down the path of the first cable after installing the second cable.

An advantage of the present invention is its ability to allow the capacity of the system to be increased without having to cut into one of the existing cables, thus not interrupting service to the end user.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. These specific embodiments discussed herein are merely illustrative of specific ways to make and use the invention, and do not delimit the scope of the invention.

Figure 1:
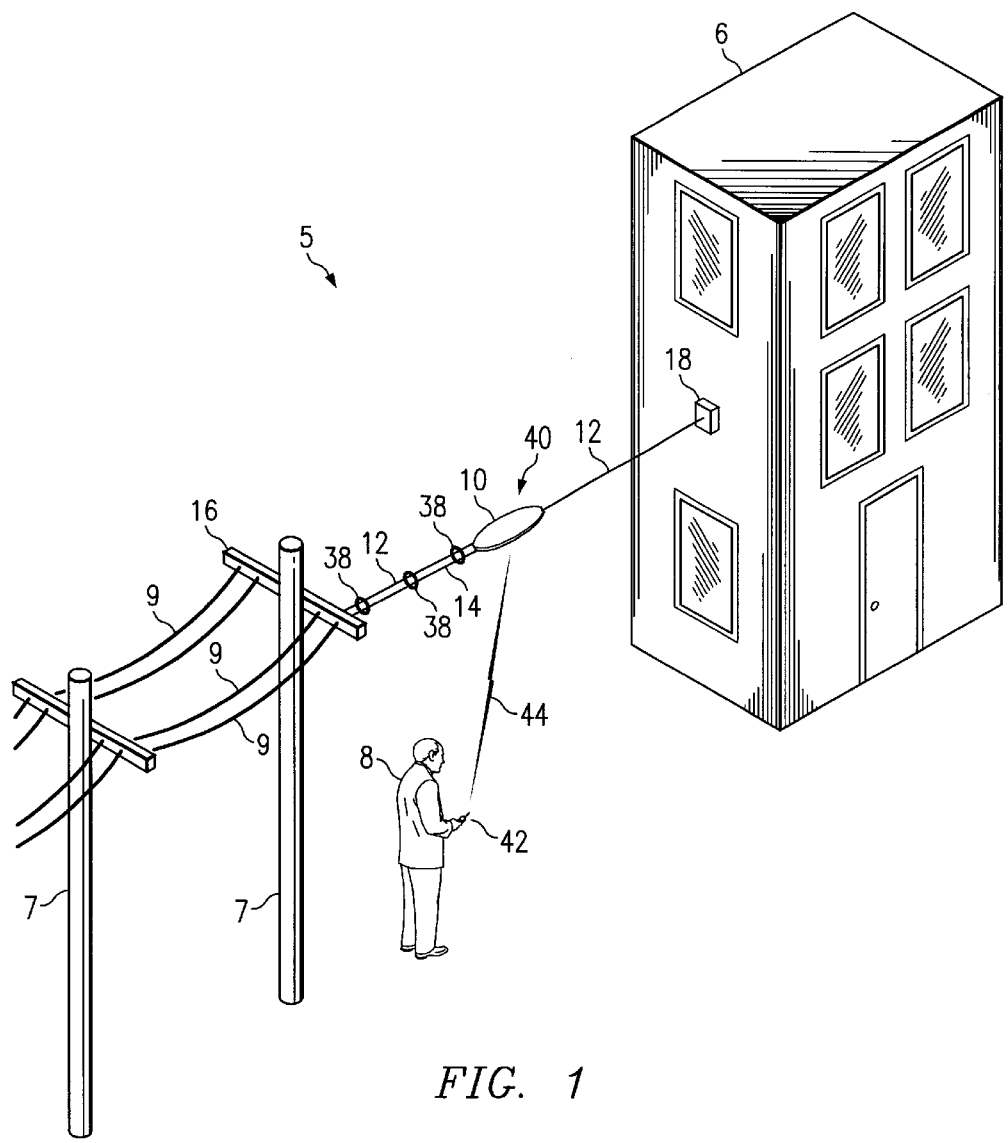
FIG. 1 depicts the use of cable puller, according to the invention.

With reference to FIG. 1, therein is shown a diagram of a cable installation 5, in which the cable puller of the invention can be used. Main service lines 9 run along telephone poles 7 which support the main lines 9 and provide a service access point to the end user. In this regard, it should be understood that other installation configurations may benefit from the present invention, such as ground installation and other wired services. From the main service lines 9, a first cable 12 extends from a first support point 16 on a telephone pole 7 to a second support point 18 on building 6. In this way, an end user within the building 6 achieves access to the services provided by access lines 9. The type and variety of such services may be many and varied according to location and service offering. Examples include electric, telephone and other utility type services as well as cable television, Internet access and others.

The present invention provides a way of installing additional access cables to the main service lines 9 to provide additional capacity for end users.

In order to increase the capacity of cable service to building 6, it is necessary to add a second cable 14 between first support 16 and second support 18. With the present invention, an installation technician 8 places a cable puller 10 on the first cable 12 and pulls a second cable 14 into position alongside an existing first cable 12. The installation technician 8 holds a transmitter 42 which is communicably linked by a radio signal 44 to a receiver 40 inside the cable puller 10. Alternatively, a control line could be used that couples the transmitter 42 to the cable puller 10. The installation technician 8 transmits command signals from transmitter 42 to receiver 40 to control the motions of the cable puller 10. As the cable puller 10 proceeds along the first cable 12, it also sets tie wraps 38 at intervals along the first and second cables 12 and 14, respectively. Tie wraps 38 are left loose as the cable puller 10 proceeds up the first cable 12 toward the second support 18. This is to allow the second cable 14 to slide through the tie wraps 38 as the cable puller 10 pulls the second cable 14 into position.

When cable puller 10 reaches second support 18, the second cable 14 is disconnected from the cable puller 10 and connected, according to the type of cable service desired. Command signals 44 are sent by the installation technician 8 to the cable puller 10 causing the cable puller 10 to drive back along first cable 12. As the cable puller 10 returns towards the first support 16, the tie wraps 38 are tightened to secure the first and second cables 12 and 14, respectively, together.

Figure 2:
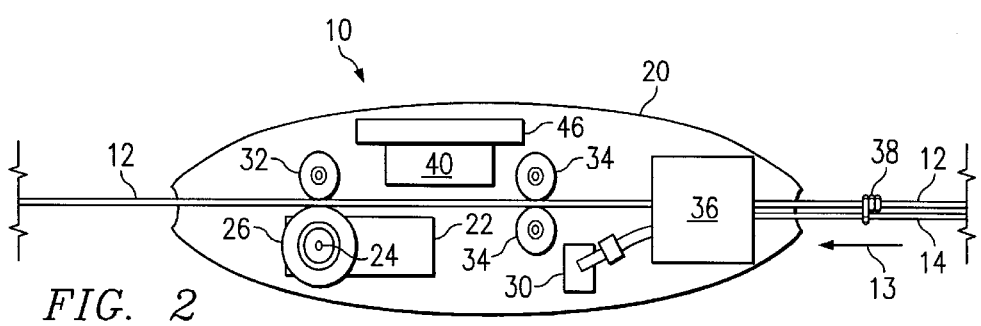
FIG. 2 is a more detailed illustration of the cable puller of the invention, according to a preferred embodiment.

FIG. 2 is a diagram illustrating the preferred embodiment of the cable puller 10, according to the present invention. The cable puller 10 is shown attached to the existing first cable 12. The cable puller 10 has a body 20 with an opening which allows the existing first cable 12 to pass through the body 20. The cable puller 10 also comprises a cable clamp 30, which is used to hold a second cable 14. Second cable 14 is pulled into position along side of the existing first cable 12 by cable puller 10 in the direction of arrow 13.

In order for the cable puller 10 to move along the existing first cable 12, a motor 22 is utilized. In one embodiment, motor 22 is an electric motor and may be sized for the proper operation, as can be appreciated by those skilled in the art. The motor 22 has a shaft 24, which is used to translate the electrical energy into mechanical energy and assist in driving the cable puller 10 into position. A drive wheel 26 is attached to the shaft 24. In operation, drive wheel 26 pushes against first cable 12 in order to propel the cable puller 10 along the first cable 12 and pull the second cable 14 into position. The attachment mechanism between the drive wheel 26 and the shaft 24 may include gears, belts and pulleys, or other means known to those skilled in the art.

Initially, the cable puller 10 has a pressure wheel 32 which helps hold the drive wheel 26 against the first cable 12 so that the cable puller 10 may have a more positive drive action along first cable 12. Cable puller 10 further includes drive wheels 34 which help to guide first cable 12 as it passes through cable pulley 10.

Another feature of cable puller 10 is cable crimper 36. Cable crimper 36 places a tie wrap 38 around first cable 12 and loosely around second cable 14 as cable puller 10 proceeds from the first support 16 to the second support 18. The tie wraps 38 are adapted to hold the second cable 14 in position. However, the tie wraps 38 are not tightened as cable puller 10 proceeds to pull second cable 14 into position. Tie wraps 38 are left loose around the second cable 14 such that second cable 14 may slide through the tie wraps 38 as it is pulled into position by cable puller 10.

Cable puller 10 is further adapted to have a signal receiver 40 which is adapted for receiving command signals 44 from a remotely located signal transmitter 42 (shown in FIG. 1). Power is provided for both electrical motor 22 and signal receiver 40 by battery 46. Battery 46 provides not only the propulsion power but also the power to the receiver 40 which receives the command signals 44 from the remotely located transmitter 42 which is operated by an installation technician 8.

Figure 3A:
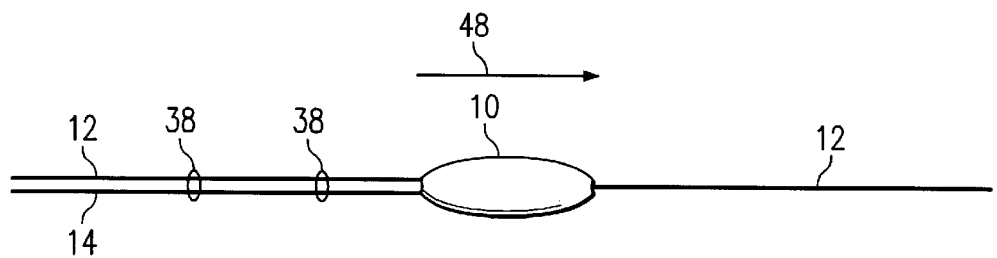
FIGS. 3A and 3B illustrate use of a cable puller to install a second cable alongside an existing first cable.
Figure 3B:
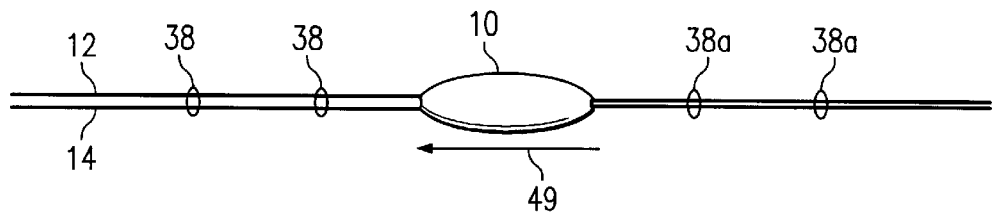

In FIG. 3A, the installation of a second cable 14 alongside an existing cable 12 is depicted. Tie wraps 38 are loosely positioned around second cable 14 so that the second cable 14 may slide through the tie wraps 38 as cable puller 10 proceeds along first cable 12, towards its destination in the direction of arrow 48. In FIG. 4B, cable puller 10 has pulled the second cable 14 to a destination in the direction of arrow 49 and is returning along first cable 12. As cable puller 10 proceeds along first cable 12, the tie wraps are tightened around the first and second cables 12 and 14, respectively. Tightened tie wraps are denoted as 38a. The end result is an installation consisting of two cables, 12 and 14, which are attached to each other and available for delivering services to end users.

Figure 4:
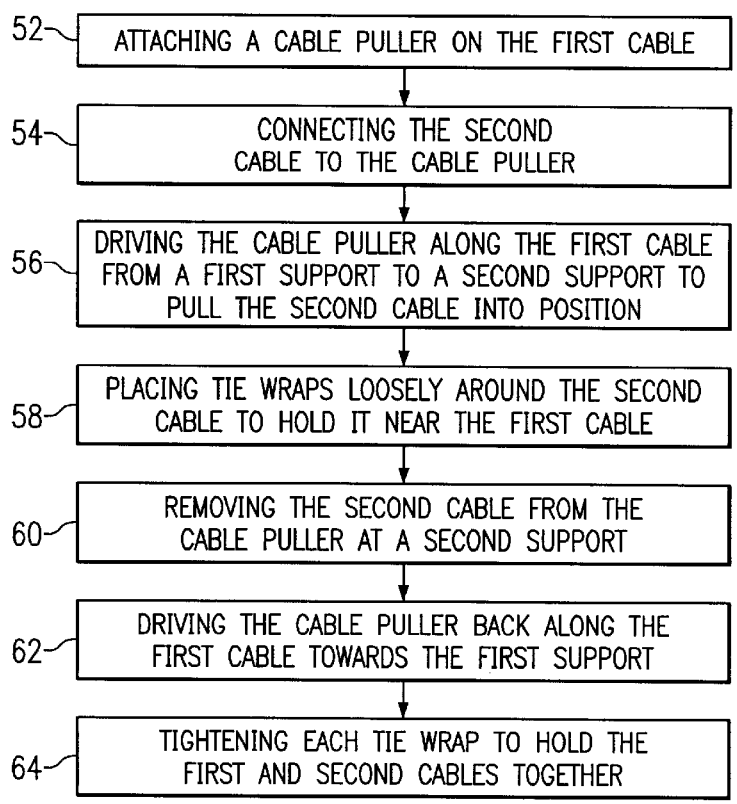
FIG. 4 is flow diagram of a method for using the cable puller, according to the invention.

FIG. 4 is a flow diagram of a method for installing a second cable along an existing first cable, according to the invention. The method, denoted generally as 50, involves using a remotely controlled cable puller 10 to pull a second cable 14 into place along side of an existing first cable 12. The cable puller 10 consists of a motor 22 which drives the cable puller 10, through a drive wheel 26, along first cable 12 while pulling the second cable 14 into place.

At step 52, the cable puller 10 is attached onto the existing first cable 12. Next, at step 54, second cable 14 is attached to cable clamp 30 on cable puller 10 so that the cable puller 10 can pull the second cable 14 as cable puller 10 travels along the first cable 12. At step 56, cable puller 10 drives along the first cable 12 and pulls the second cable 14 into position. For example, cable puller 10 pulls the second cable 14 from a first support 16 to a second support 18. Next, at step 58, cable puller 10 places tie wraps 38 along the first and second cables 12, 14 to loosely hold the first cable 12 and second cable 14 together. At step 60, the second cable 14 is removed from cable puller 10 upon reaching the destination at the second support 18. At step 62, cable puller 10 is driven back along the first cable 12 to first support 16. Finally, at step 64, the cable puller 10 tightens the tie wraps 38 so the tightened tie wraps 39 will hold the first and second cables 12, 14 securely together.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. A cable puller for installing a second cable along side an existing first cable comprising:

a body;

a motor mounted to said body and having an output shaft attached to a drive wheel, said drive wheel turning against said first cable to propel said body along said first cable;

a motor controller operably coupled to said motor to control its motion;

a cable clamp attached to said body to hold said second cable as it is pulled along said first cable; and a cable crimper adapted to set a plurality of tie wraps along said first cable.

2. The cable puller of claim 1 wherein said cable crimper is further adapted to tighten said tie wraps around said first and second cables.

3. The cable puller of claim 1 wherein said motor controller further comprises a signal receiver adapted for receiving command signals.

4. The cable puller of claim 1 further comprising at least one pressure wheel attached to said body and adapted to press said first cable against said drive wheel.

5. The cable puller of claim 1 further comprising at least one guide wheel attached to said body and adapted to guide said first cable through said body.

6. The cable puller of claim 1 wherein said motor controller further comprises a signal receiver adapted for receiving command signals.

7. The cable puller of claim 6 wherein said motor controller further comprises a remotely located signal transmitter communicably linked to send said command signals to said signal receiver.

8. The cable puller of claim 7 wherein said transmitter and receiver are communicably linked with a radio signal.

9. The cable puller of claim 7 wherein said transmitter and receiver are communicably linked with an infrared light signal.

10. The cable puller of claim 7 wherein said transmitter and receiver are communicably linked with an infrared light signal.

11. The cable puller of claim 7 wherein said transmitter and receiver are communicably linked with a control wire.

12. A method for installing a second cable along an existing first cable in a telecommunications network comprising the steps of:

attaching a cable puller on the first cable;

connecting the second cable to the cable puller;

driving the cable puller along the first cable from a first support to a second support to pull the second cable into position; and placing tie wraps loosely around said second cable to hold it near said first cable.

13. The method according to claim 12 wherein said driving step is followed by the step of removing said second cable from said cable puller at a second support.

14. The method according to claim 13 wherein said step of removing said second cable is followed by a step of driving the cable puller back along said first cable towards said first support.

15. The method according to claim 14 wherein said step of driving the cable puller back further includes the step of tightening each tie wrap to hold said first and second cables together.

16. A cable installation system comprising:

a first cable hanging between first and second supports;

a second cable;

a cable puller for installing said second cable along said first cable; and a cable crimper adapted to set a plurality of tie wraps along said first cable.

17. The system of claim 16 wherein said cable crimper is further adapted to tighten said tie wraps around said first and second cables.

18. The system of claim 16 wherein said cable puller further comprises:

a body; and a motor mounted on said body and having an output shaft attached to a drive wheel, wherein said drive wheel turns against said first cable to propel said body along said first cable.

19. The system of claim 16 wherein said cable puller further comprises a motor controller operably coupled to said motor to control its motion.

20. The system of claim 16 wherein said cable puller further comprises a cable clamp attached to said body to hold said second cable as it is pulled along said first cable.

21. The system of claim 16 wherein said cable puller further comprises at least one pressure wheel attached to said body and adapted to press said first cable against said drive wheel.

22. The system of claim 16 wherein said cable puller further comprises at least one guide wheel attached to said body and adapted to guide said first cable through said body.

23. The system of claim 16 wherein said motor controller further comprises a signal receiver adapted for receiving command signals.

24. The system of claim 16 wherein said motor controller further comprises a remotely located signal transmitter communicably linked to send said command signals to said signal receiver.

25. The system of claim 24 wherein said transmitter and receiver are communicably linked with a radio signal.

26. The system of claim 24 wherein said transmitter and receiver are communicably linked with a light signal.

27. The system of claim 24 wherein said transmitter and receiver are communicably linked with an infrared light signal.

28. The system of claim 24 wherein said transmitter and receiver are communicably linked with a control wire.

* * * * *